US008401200B2

(12) United States Patent
Tiscareno et al.

(10) Patent No.: US 8,401,200 B2

(45) Date of Patent: Mar. 19, 2013

(54) ELECTRONIC DEVICE AND HEADSET WITH SPEAKER SEAL EVALUATION CAPABILITIES

(75) Inventors: Victor Tiscareno, Issaquah, WA (US); Jeffrey J. Terlizzi, San Francisco, CA (US); Wendell B. Sander, Los Gatos, CA (US); Christopher Todd Beauchamp, San Jose, CA (US)

(73) Assignee: Apple Inc., Cupertino, CA (US)

( * ) Notice: Subject to any disclaimer, the term of this patent is extended or adjusted under 35 U.S.C. 154(b) by 315 days.

(21) Appl. No.: 12/622,371

(22) Filed: Nov. 19, 2009

(65) Prior Publication Data

US 2011/0116643 A1 May 19, 2011

(51) Int. Cl.

| | |
|---|---|
| ***H04R 29/00*** | (2006.01) |
| ***H04R 1/10*** | (2006.01) |
| ***H04B 15/00*** | (2006.01) |

(52) U.S. Cl. .............. 381/58; 381/59; 381/74; 381/94.1

(58) Field of Classification Search .................... 381/58, 381/59, 74, 94.1, 60, 56, 312, 317; 455/570, 455/114.2, 575.2

See application file for complete search history.

(56) References Cited

U.S. PATENT DOCUMENTS 5,138,722 A 8/1992 Urella et al.
5,764,781 A * 6/1998 Ding .............................. 381/96
6,321,070 B1 11/2001 Clark et al.
2003/0174853 A1 9/2003 Howes et al.
2004/0017921 A1* 1/2004 Mantovani .................. 381/94.9
2005/0147269 A1 7/2005 Oliveira et al.
2006/0126857 A1* 6/2006 Pavlov et al. .................. 381/59
2007/0177741 A1* 8/2007 Williamson ................ 381/71.6
2009/0226025 A1 9/2009 Howes et al.

* cited by examiner

*Primary Examiner* — Vivian Chin
*Assistant Examiner* — Douglas Suthers
(74) *Attorney, Agent, or Firm* — Blakely, Sokoloff, Taylor & Zafman LLP

(57) ABSTRACT

Electronic devices and accessories for electronic devices such as headsets are provided. The electronic devices may produce audio output. The headsets may include earbuds with speakers that play the audio output for a user while the earbuds are located in the user's ears. Circuitry in an electronic device and a headset may be used in evaluating how well the earbuds are sealed to the user's ears. In response to seal quality measurements, informative messages can be generated for the user, overall earbud volume may be increased, balance adjustments may be made to correct for mismatched balance between left and right earbuds, equalization settings may be adjusted, and noise cancellation circuitry settings can be changed. Electrical impedance measurements and acoustic measurements can be used in evaluating seal quality.

22 Claims, 11 Drawing Sheets

ELECTRONIC DEVICE AND HEADSET WITH SPEAKER SEAL EVALUATION CAPABILITIES

BACKGROUND

It is often desirable to use headphones when listing to music and other audio material. For example, users commonly use headphones when listening to music that is being played back from a portable music player. Over-the-ear headphones are sometimes used, particularly in environments in which size is not a major concern. When a compact size is desired, users often use in-ear headphones. Earbud headphones are popular because they form a seal in the ear that helps to reduce ambient noise while retaining the compact size of other in-ear designs.

The speakers in earbud headphone are encased in earbuds. During use, the earbuds are placed in the ears of a user. When properly seated in the user's ear, the earbuds form a seal. If the seal between the earbuds and the user's ear is formed correctly, music can be played back satisfactorily. Poor seals can adversely affect performance. For example, noise cancellation operations can be degraded and volume levels can be affected.

It would therefore be desirable to provide improved headphones such as improved earbud headphones.

SUMMARY

Electronic devices and accessories for electronic devices such as headsets are provided that can assess how well speakers are seated in relation to a user's ears. The electronic devices may be portable music players, computers, cellular telephones, or other electronic devices that produce audio. The audio may be played back by the accessories.

The accessories may be headphones such as earbud headphones. Each earbud in an earbud headphone may contain a speaker. Audio performance may be affected by the degree to which the earbuds form seals with the user's ears. To compensate for potential variations in seal quality, seal quality measurements may be made during use of the earbuds and appropriate actions taken.

Control circuitry in an electronic device may be used to generate audio output signals during media playback operations. The control circuitry may also generate test signals such as sine wave test tones. Communications circuitry in the control circuitry of the electronic device may communicate with corresponding communications circuitry in control circuitry located in an attached headset.

Seal quality measurements may be made using speaker impedance measurements. With this type of arrangement, the control circuitry of the electronic device and headset may be used to apply signals to the speakers of the earbud while monitoring speaker currents. The signals that are applied to the earbud speakers may be test tones. While applying the test tones, speaker current measurements may be made using a current sensing resistor. Speaker current measurements may also be made by monitoring speaker current flow using a secondary speaker coil and associated current sensing circuitry.

Acoustic measurements may also be made to evaluate earbud seal quality. With this type of arrangement, the control circuitry of the electronic device and the headset may be used to drive the earbud speakers with an output signal while sound amplitude measurements are made using in-ear microphones. The signals that are used to drive the earbud speakers may be, for example, low frequency sine wave test tones.

The control circuitry in the electronic device and the headset may be used in evaluating how well the earbuds are sealed to the user's ears based on the results of the electrical impedance measurements and/or acoustic measurements. In headsets with noise cancellation circuitry, noise cancellation circuits can be used to produce an output that varies depending on the quality of the seal that is made with the user's ears.

Actions can be taken by the circuitry in the device and headset in response to seal quality measurements. Poor seal quality may result in performance degradation. For example, low quality earbud seals may result in poor stereo balance, loss in overall earbud volume, suboptimal equalization, and less effective noise cancellation. In response to measured reductions in seal quality, actions may be taken such as generating informative messages for the user, increasing overall earbud volume, correcting mismatched balance between left and right earbuds, adjusting equalization settings, and making adjustments to noise cancellation circuitry.

Further features of the invention, its nature and various advantages will be more apparent from the accompanying drawings and the following detailed description of the preferred embodiments.

DETAILED DESCRIPTION

Electronic devices such as computers, cellular telephones, and portable music players are often connected to headphones and other accessories with speakers. In a typical arrangement, a headset has a cable that is plugged into an audio jack in an electronic device. The headset has speakers that are used to play back audio material from the electronic device. For example, the headset may play a song for a user of a music player or may be used to present telephone call audio signals to the user of a cellular telephone.

Earbud headsets have speakers that are housed in earbuds. The earbuds may have elastomeric features that conform to the ear canal of a user's ear. For example, an earbud may have a foam structure or soft plastic fins that help seat the earbud in the user's ear.

When properly positioned in the user's ear, the earbud forms a seal with the user's ear. The seal blocks ambient noise. The seal also forms an enclosed cavity adjacent to the ear.

A poor seal generally results in poor earbud performance. For example, a poor seal may change the acoustic properties of the enclosed cavity in a way that disrupts the normal operation of the earbud speaker. Bass response may be significantly reduced. Noise cancellation performance may also suffer. A poorly sealed earbud may also sound much quieter to the user than a well sealed earbud, so a poor seal may adversely affect the balance between right and left channels during stereo playback.

Figure 1:
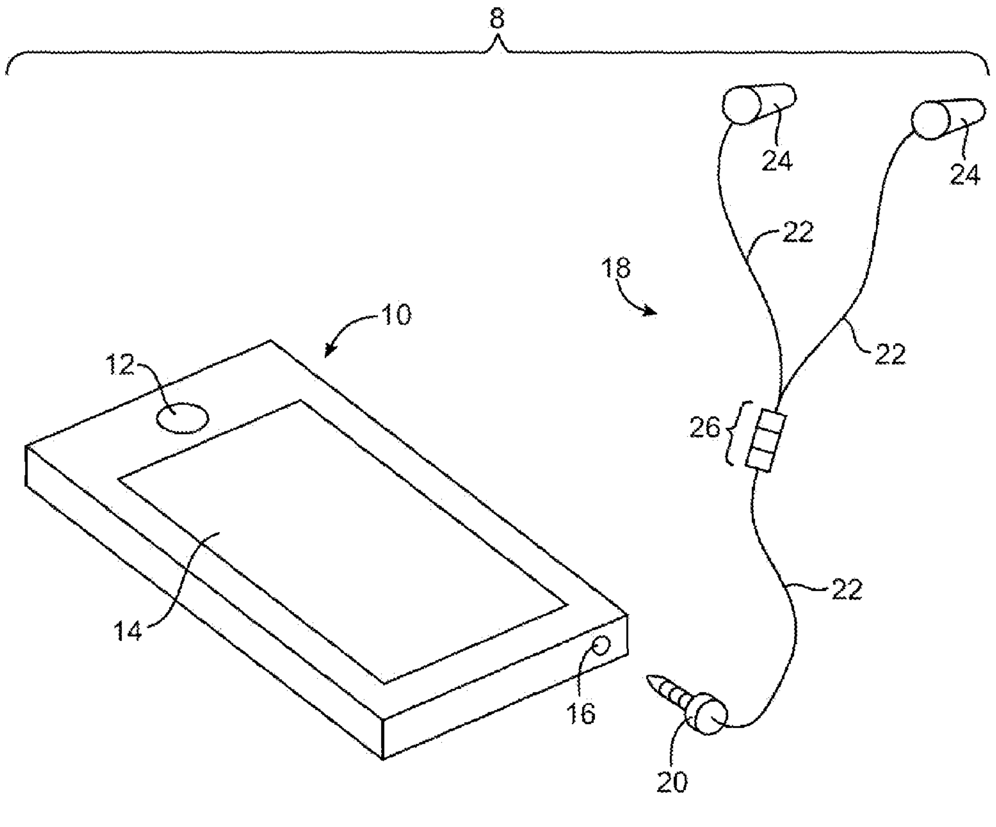
FIG. 1 is a perspective view of an illustrative system that includes an electronic device and an associated headset in accordance with an embodiment of the present invention.

These issues can be addressed in a system of the type shown in FIG. 1 by monitoring ear seal quality and taking appropriate action. As shown in FIG. 1, system 8 may include an electronic device such as electronic device 10 and may include an accessory such as headset 18.

Device 10 may be a cellular telephone with media playback capabilities, a portable computer such as a tablet computer or laptop computer, a desktop computer, a television, an all-in-one computer that is housed in the case of a computer monitor, television equipment, an amplifier, or any other suitable electronic equipment. Device 10 may have input-output components such as button 12 and display 14. Display 14 may be a touch screen or a display without touch capabilities.

Accessory 18 may be a headset or other device that includes speakers. Accessory 18 may, for example, be a headset that includes a voice microphone for handling telephone calls, a pair of stereo headphones that contains speakers but that does not include a voice microphone, a single-speaker device such as a wireless earpiece, hearing aid, or monaural headphone, etc. Arrangements in which accessory 18 is implemented using one or more earbud-styles speakers (i.e., arrangements in which accessory 18 is a set of earbud headphones) are sometimes described herein as an example.

In the example of FIG. 1, headset 18 has earbuds 24. Button assembly 26 may include user-controlled buttons and an optimal voice microphone. Circuitry for headset 18 may be housed in button assembly 26 or in earbuds 24 (as examples). If desired, headset 18 may have different types of user input interfaces (e.g., interfaces based on microphones, touch screens, touch sensors, switches, etc.). The inclusion of button assembly 26 in headset 18 of FIG. 1 is merely illustrative.

Cables such as cables 22 may be used to interconnect earbuds 24, button assembly 26, and plug 20. Plug 20 may be implemented using an audio plug (e.g., a 3.5 mm tip-ring-ring-sleeve or tip-ring-sleeve connector), using a digital connector (e.g., a universal serial bus connector or a 30-pin data port connector), or using any other suitable connector. Connector 20 may have contacts that mate with corresponding contacts in port 16. For example, if connector 20 is a four-contact 3.5 mm audio plug, port 16 may be a mating four-contact 3.5 mm audio jack.

Figure 2:
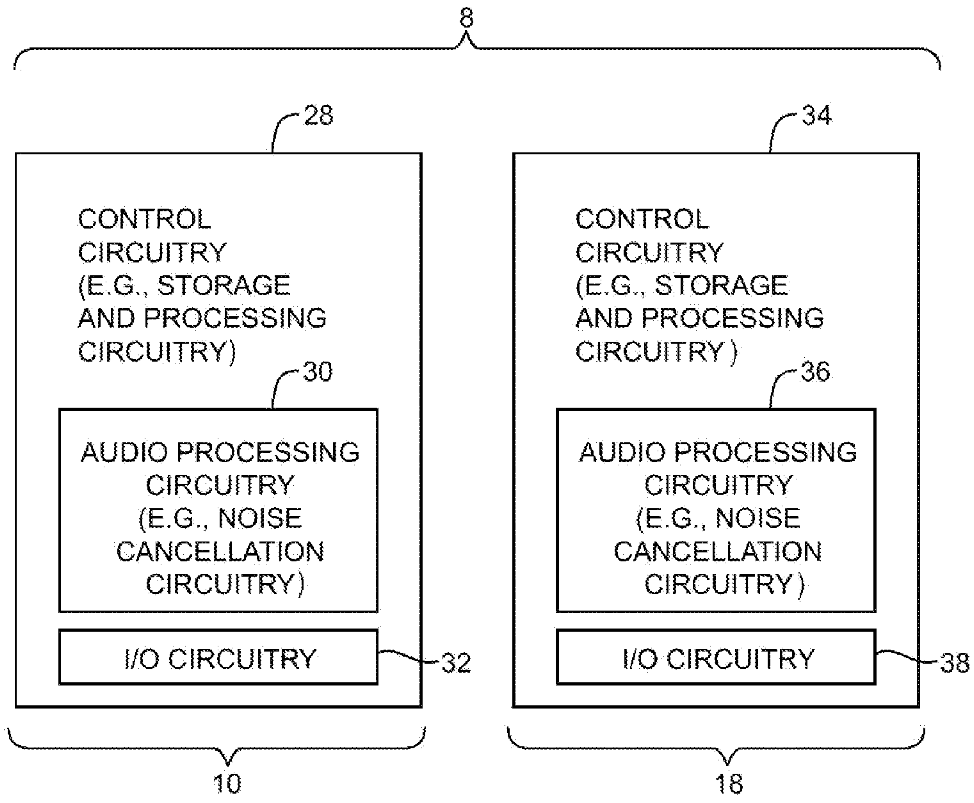
FIG. 2 is a schematic diagram showing circuitry that may be used in an electronic device and headset accessory in a system of the type shown in FIG. 1 in accordance with an embodiment of the present invention.

Circuitry that may be used in device 10 and headset 18 of FIG. 1 is shown in FIG. 2. As shown in FIG. 2, device 10 may include control circuitry 28 and accessory 18 may include control circuitry 34. Circuitry 28 and 34 may include storage and processing circuitry that is based on microprocessors, application-specific integrated circuits, audio chips (codecs), video integrated circuits, microcontrollers, digital signal processors (e.g., audio digital signal processors), memory devices such as solid state storage, volatile memory (e.g., random-access memory), and hard disk drives, etc.

As shown in FIG. 2, circuitry 28 may, if desired, include noise cancellation circuitry and other audio processing circuitry 30. Circuitry 34 may include noise cancellation circuitry and other audio processing circuitry 36, if desired. Circuitry 28 may include input-output circuitry 32. Circuitry 34 may include input-output circuitry 38. Input-output circuitry 32 and 38 may include user input devices such as buttons, touch pads, track pads, keyboards, switches, microphones, and touch screens. Input-output circuitry may also include output devices such as displays, speakers, and status indicators.

Input-output circuitry 32 and 38 may include communications circuitry that is associated with ports such as port 16 of device 10 and plug 20 of accessory 18. This communications circuitry may be used to transmit analog and/or digital signals between device 10 and headset 18. Cables such as cable 22 and connectors such as connectors 16 and 20 may form a communications path that can be used in conveying signals between device 10 and headset 18. The communications path may be used to transmit audio from circuitry 28 to earbuds 24 during playback operations.

The communications path may also be used to convey noise cancellation signals. Noise cancellation may, for example, be performed using the processing circuitry of device 10 (e.g., using noise cancellation circuitry 30). In this type of arrangement, noise cancellation microphone signals from headset 18 may be routed to circuitry 30. Circuitry 30 may then route audio signals from which the noise has been cancelled to headset 18. If desired, noise cancellation operations may be performed locally in headset 18. With this type of arrangement, noise cancellation circuitry 36 in headset 18 can receive audio playback signals from device 10 and can receive noise cancellation microphone signals from noise cancellation microphones in headset 18. Circuitry 36 can then cancel noise from the played back audio.

The quality of the seals that are formed between earbuds 24 and a user's ears affects performance. For example, satisfactory noise cancellation can become difficult when is high-quality seal is not present. Poor earbud-to-ear seals can also affect audio quality in other ways. For example, left-right balance (volume) and equalization can be affected by seal quality.

Figure 3:
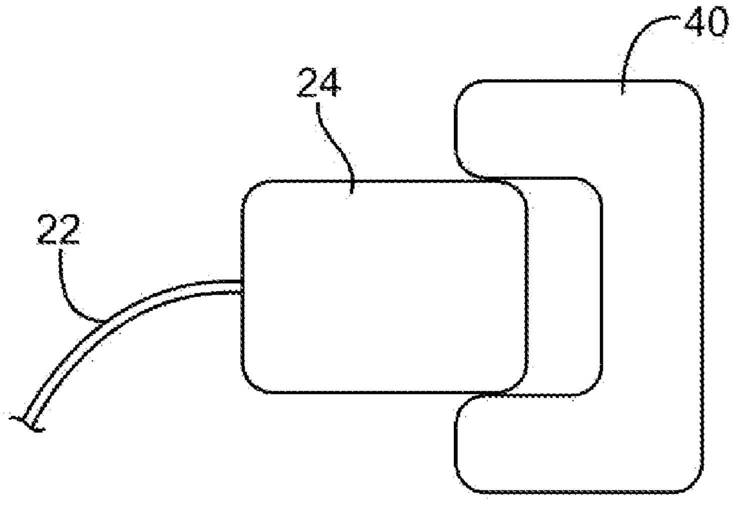
FIG. 3 is a cross-sectional side view of an illustrative earbud that has been placed in a user's ear so as to form a high-quality seal between the earbud and ear that may be detected in accordance with an embodiment of the present invention.
Figure 4:
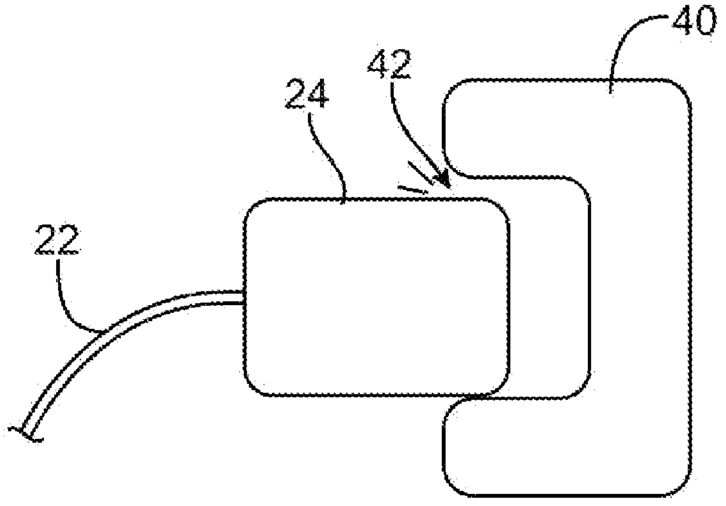
FIG. 4 is a cross-sectional side view of the illustrative earbud of FIG. 3 showing how the earbud may sometimes form a lower-quality seal with the user's ear that may be detected in accordance with an embodiment of the present invention.

FIG. 3 shows how an earbud may be positioned within an ear to form a high-quality seal. In the example of FIG. 3, earbud 22 has been inserted into the ear canal portion of ear 44 sufficiently to form a seal between the outer surfaces of earbud 24 and the corresponding surfaces of ear 40. In the FIG. 4 example, earbud 24 has only been partly inserted into ear 40, resulting in gap 42. The presence of gap 42 reduces the quality of the seal in the FIG. 4 arrangement relative to the quality of the seal in the FIG. 3 arrangement. Larger gaps will result in poorer seal quality, whereas smaller gaps will exhibit better seal quality.

During operation, circuitry 28 and/or circuitry 34 of FIG. 2 may be used in assessing earbud seal quality in real time and in taking appropriate actions. Seal quality may be measured by determining the impedance of the earbud speakers in headset 18 using current measurements and/or by making acoustic measurements. In headsets with noise cancellation circuitry, the noise cancellation circuitry may also supply an output that is indicative of the level of noise cancellation that is being used and that is therefore indicative of seal quality.

Figure 5:
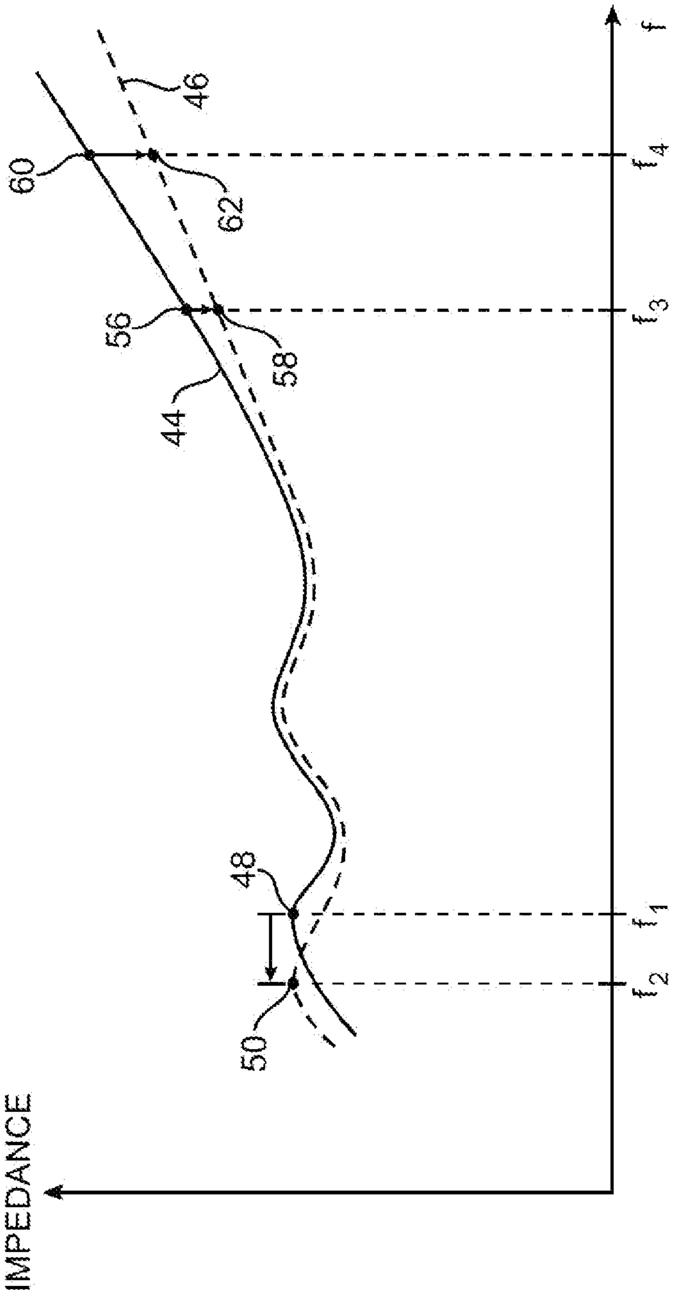
FIG. 5 is a graph showing how the impedance of an earbud may exhibit measurable changes that reflect the quality of the seal between the earbud and a user's ear in accordance with an embodiment of the present invention.

An illustrative graph showing how earbud impedance (e.g., in ohms) may vary as a function of signal frequency f (e.g., in Hz) is shown in FIG. 5. Solid line 44 corresponds to earbud impedance in the presence of a high-quality seal. Dashed line 46 corresponds to earbud impedance in the presence of a low-quality seal. Earbud-to-ear seals of intermediate quality will tend to exhibit characteristics between those of lines 44 and 46.

As the FIG. 5 example demonstrates, the impedance-versus-frequency curve for headset 18 responds to seal quality changes differently in different frequency ranges.

At frequencies in the vicinity of frequency f1, the lowering of seal quality causes resonance peak 48 of solid line 44 to shift to the position occupied by peak 50 of dashed line 46 (i.e., to shift from frequency f1 to frequency f2). Frequency f1 may be, for example, 250 Hz and frequency f2 may be, for example, 230 Hz (as an example). Circuitry 28 and/or circuitry 34 can monitor the position of the resonance peak and can assess seal quality from the measured frequency of the peak. If desired, a series of impedance data points may be periodically acquired and analyzed to determine the current peak location and thereby compute a seal quality value.

At higher frequencies, the lowering of seal quality may result in an overall reduction in impedance. For example, at frequency f3, impedance may drop from point 56 (when seal quality is high) to point 58 (when seal quality is low). Similarly, impedance may drop from point (corresponding to a high seal quality at frequency f4) to point 62 (corresponding to a low seal quality at frequency f4). The range of frequencies in which seal quality reductions result in corresponding impedance reductions of the type illustrated in connection with frequencies f3 and f4 may be, for example, frequencies in the upper range of the audible spectrum (e.g., 10-20 kHz) or, more typically, ultrasonic frequencies. To determine seal quality at frequencies f3 and f4, one or more impedance measurements may be made and, if desired, curve-fitting techniques may be used to determine whether the earbud is exhibiting an impedance behavior such as the high-quality-seal impedance behavior of line 44 or such as the low-quality-seal impedance behavior of line 46.

The impedance measurements of FIG. 5 may be made using current sensing circuitry in the audio signal output path, using a secondary sensing coil in the speaker, or using other suitable impedance monitoring arrangements. Acoustic seal-quality measurements may be made using a speaker to generate sound and a corresponding microphone to measure sound. For example, an earbud speaker or other transducer may be used to generate an audio signal such as a test tone while the earbud is located in the user's ear. A microphone in the earbud may be used to make real time measurements to assess seal quality.

Figure 6:
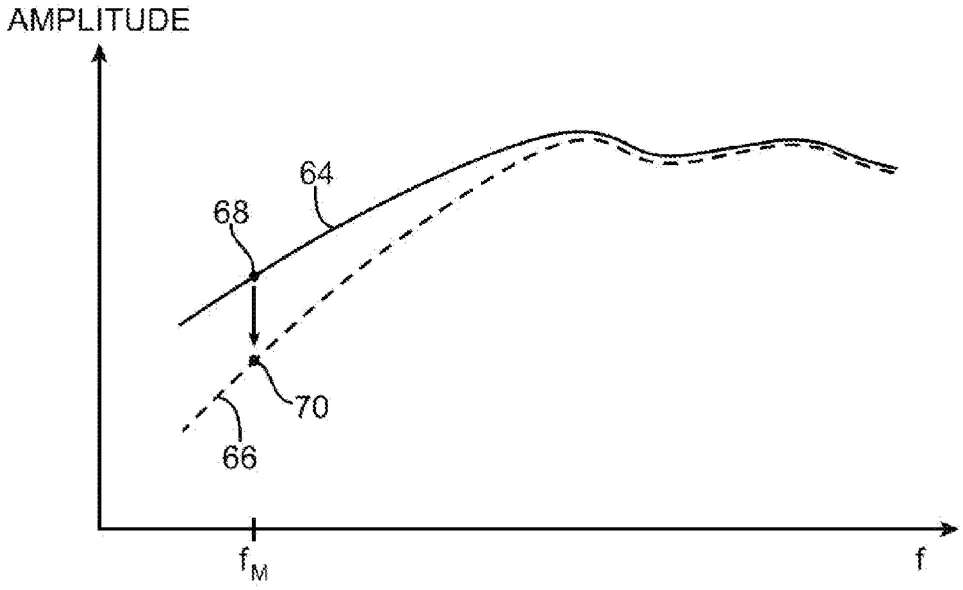
FIG. 6 is a graph showing how acoustic measurements may be made to assess earbud seal quality for a headset in accordance with an embodiment of the present invention.

If seal quality is high, the amplitude of the sound that is generated in the user's ear may be characterized by a curve such as solid curve 64 of FIG. 6. For example, at frequency fm, the amplitude of the sound that is measured by the microphone may be represented by point 68 on line 64. If seal quality drops, the amplitude of the sound that is present in the user's ear may be characterized by a curve such as dashed curve 66 of FIG. 6. For example, at frequency fm, the amplitude of the measured sound may be represented by point 70 on line 66.

The frequencies at which sound amplitude is most sensitive to seal quality tend to be fairly low (e.g., about 5 Hz, 10 Hz, less than 15 Hz, etc). This allows seal quality to be assessed by generating a 5 Hz tone (for example) with the earbud speaker while measuring the resulting sound amplitude at 5 Hz with the earbud microphone. If the measured sound level is high, seal quality is high. If the measured sound level is low, seal quality is low. The sound at 5 Hz (or other suitable low frequency) can be produced using a 5 Hz test tone or measurements may be performed during normal audio playback (e.g., by filtering the audio output signal to determine signal strength at 5 Hz and by filtering the corresponding microphone to determining the corresponding sound amplitude at 5 Hz).

Figure 7:
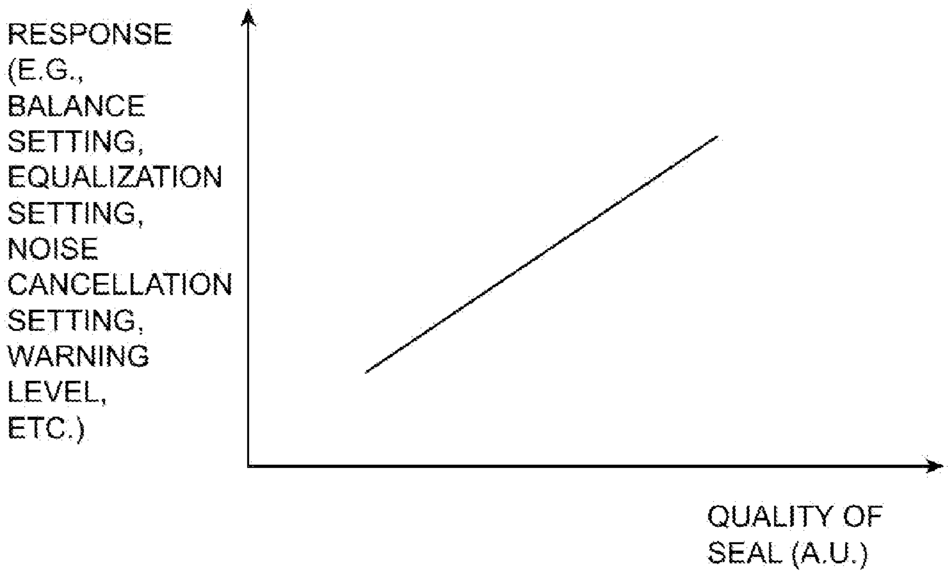
FIG. 7 is a graph showing how adjustable system parameters may be controlled or other suitable actions may be taken based on measured earbud seal quality in accordance with an embodiment of the present invention.

Once seal quality has been evaluated, appropriate actions may be taken. As illustrated in FIG. 7, for example, the amount of response that is made may vary as a function of measured sound quality level. Examples of parameters that may be varied as a function of measured earbud seal level include, sound volume, equalization (i.e., frequency-dependent sound volumes), balance (i.e., sound volumes of the left speaker relative to the right speaker in a stereo headset), noise cancellation level (e.g., active noise cancellation in situations in which the seal is adequate and disabled noise cancellation in situations in which the seal is poor), etc. If desired, low seal quality levels (e.g., levels below one or more different thresholds) may result in warnings. For example, if the seal quality level drops below a first threshold, display 14 of FIG. 1 may be used to present a warning such as "your earbuds are not seated properly, please adjust for optimum sound quality." If the seal quality level drops below a second threshold, device 10 may use display 14 to display a more severe warning such as "earbuds are not sufficiently sealed, noise cancellation has been turned off." Although the example of FIG. 7 shows how the magnitude of the action or parameter adjustment that is made in response to the measured earbud seal quality has a linear behavior, this is merely illustrative. Any suitable degree of response may be made as a function of measured seal quality level if desired.

Figure 8:
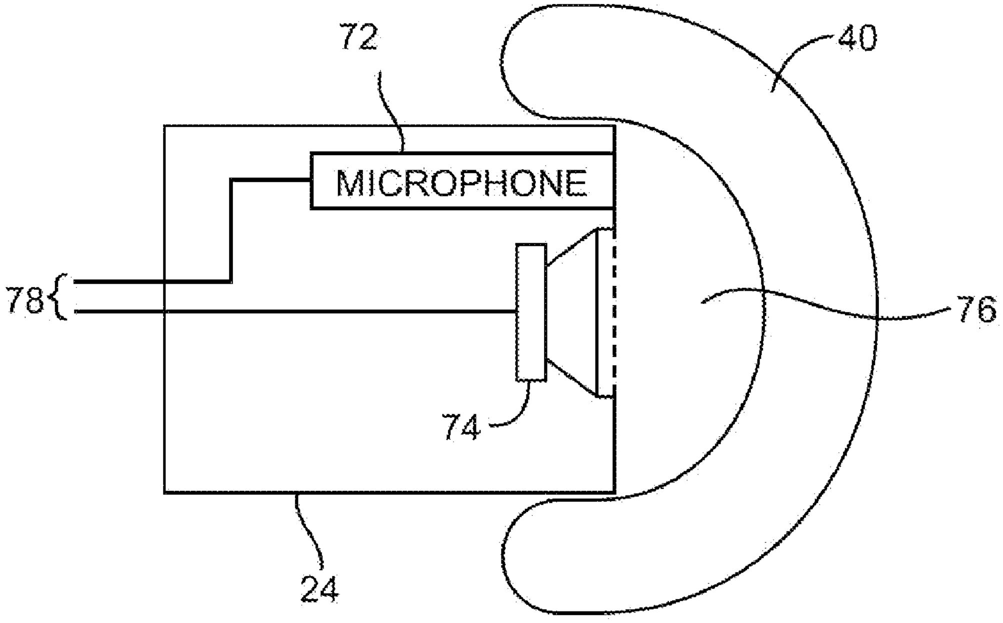
FIG. 8 is a diagram showing how an earbud may be provided with a microphone that is used in making acoustic measurements to determine how well the earbud is sealed to the user's ear in accordance with an embodiment of the present invention.

An illustrative arrangement that may be used in making acoustic measurements to determine seal quality is shown in FIG. 8. As shown in FIG. 8, earbud 24 may be placed in the ear canal of a use's ear (ear 40). In this position, ear canal air cavity 76 is formed between earbud 24 and ear 40. Paths 78 may be used to convey electrical signals to and from microphone 72 and to and from speaker driver 74. For example, paths 78 may be used to convey normal analog audio output signals to speaker 74 and/or analog test tones (e.g., a 5-15 Hz test tone). Paths 78 may also be used to gather corresponding microphone signals from microphone 72. If seal quality is high, the sound that is created by speaker driver 74 in cavity 76 (e.g., the sound amplified at the 5-15 Hz test frequency) will be fairly high (for a given drive signal level) and the resulting measured sound level from microphone 72 will be fairly high. Low quality seals will be reflected in reduced sound levels in cavity 76 and reduced output from microphone 72. Seal quality assessment operations can be performed using circuitry 34 in headset 18 and/or circuitry 28 in device 10.

Figure 9:
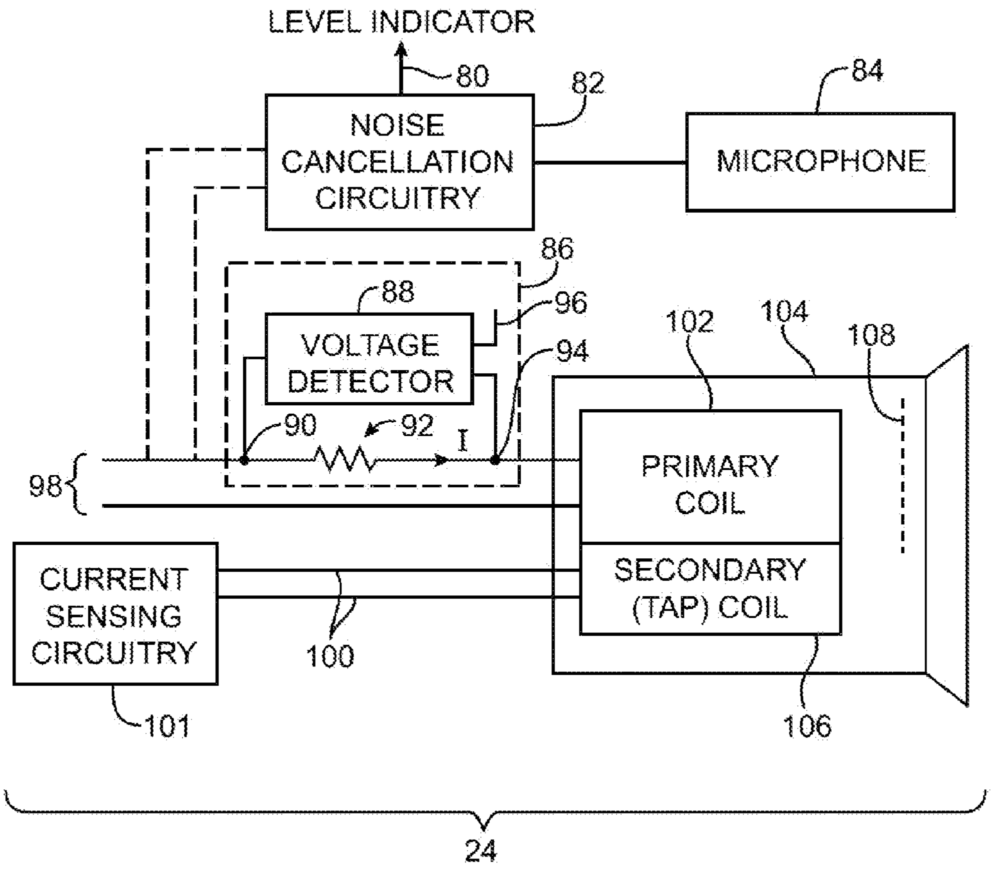
FIG. 9 is a diagram showing circuitry that may be used in evaluating earbud seal quality in accordance with an embodiment of the present invention.

Illustrative circuitry that may be used in making electrical measurements of speaker impedance is shown in FIG. 9. As shown in FIG. 9, earbud 24 may include a speaker driver such as speaker driver 104. Speaker driver 104 may have a diaphragm such as diaphragm 108 that is vibrated to create sound. Primary driver coil 102 may be used to displace diaphragm 108. During normal operation, audio signals are driven through coil 102 from path 98. The magnitude of the current I that flows in path 98 is indicative of the impedance of the earbud. If the current I is large for a given drive signal strength, impedance is low. If the current I is low for a given drive signal strength, impedance is high.

The magnitude of current I can be measured using current sensing circuitry 86. Current sensing circuitry 86 may be based on a current sensing resistor such as resistor 92. Resistor 92 may be connected in series with one of the wires in path 98. As current I flows through resistor 92 and through coil 102, a voltage drop develops across resistor 92. Voltage detector 88 has terminals coupled to nodes 90 and 94, which allows voltage detector 88 to measure the voltage drop across resistor 92. Ohm's law may then be used to calculate current I. The output of voltage detector 88, which is indicative of speaker impedance and therefore seal quality, may be supplied to circuitry 34 and/or circuitry 28 on output line 96.

The current I may also be measured using a secondary (tap) coil such as coil 106. Coil 106 and primary coil 102 may be wrapped around a common core. When coil 102 is driven by an output signal and current I flows through coil 102, electromagnetic coupling causes a proportional current to flow through secondary coil 106. This current (and therefore proportional current I) can be measured using path 100 and current sensing circuitry 101.

Circuitry 34 and/or circuitry 28 (FIG. 2) may be used to process the measured value of I (and the resulting measured impedance and resulting measured seal quality) and may be used to take appropriate action.

If desired, earbud 24 (or other structures in headset 18 or device 10) may be provided with noise cancellation circuitry 82 (i.e., circuitry 30 or 36 of FIG. 2). Microphone 84 may monitor noise in the vicinity of the ear (i.e. in cavity 76 of FIG. 8) and may provide corresponding microphone signals to noise cancellation circuitry 82. Noise cancellation circuitry 82 may also receive audio output signals (e.g., played back music). Noise cancellation circuitry 82 can process the signals from microphone 84 and the audio output signals and can produce a corresponding version of the audio output signals from which noise has been canceled. In this type of scenario, the amount of noise cancellation that is being performed may, if desired, be monitored to assess earbud seal quality. For example, if noise cancellation circuitry 82 is performing a large amount of noise cancellation, it can be concluded that the level of noise in cavity 76 is high and that seal quality is low. If noise cancellation circuitry 82 is performing a relatively small amount of noise cancellation, it can be concluded that the level of noise in cavity 76 is low and that seal quality is high. The amount of noise cancellation that is being performed at any given time can be output from noise cancellation circuitry 82 in the form of a noise cancellation metric (analog or digital noise cancellation magnitude information), as indicated schematically by output line 80. This noise cancellation metric can be evaluated by circuitry 34 and/or circuitry 28.

Figure 10:
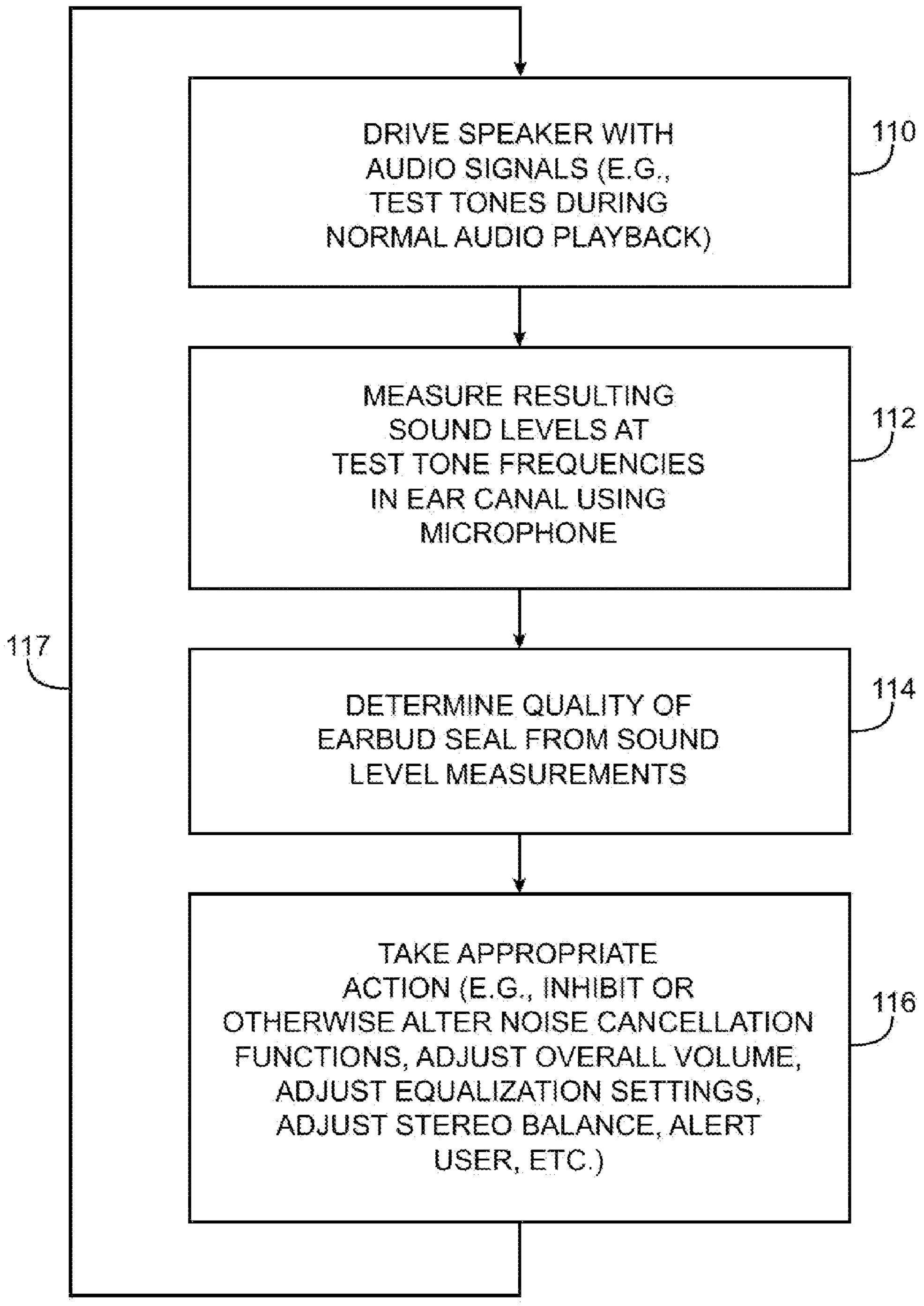
FIG. 10 is a flow chart of illustrative steps involved in making acoustic measurements with a microphone to determine earbud seal quality and in taking appropriate actions based on the measured seal quality in accordance with an embodiment of the present invention.

Illustrative steps involved in evaluating earbud seal quality using a microphone such as microphone 72 of FIG. 8 are shown in FIG. 10.

At step 110, circuitry 28 and/or circuitry 34 may be used to generate a drive signal for speaker 104. The drive signal may be, for example, a test tone signal at a suitable frequency or set of frequencies. As described in connection with FIG. 6, the acoustic behavior of earbud 24 tends to be sensitive at low frequencies such as 5 Hz, so an example of a suitable test tone that may be used is a 5 Hz sine wave. The test tone may be impressed on top of normally playing audio signals (e.g., music) or may be played in isolation.

At step 112, microphone 72 may make corresponding sound measurements. If music is playing at the same time as the test tone, a filtering operation may be performed (e.g., using circuitry 34 and/or circuitry 28) to isolate the amount of sound at the test tone frequency.

The amount of sound that is measured at the test tone frequency is an indicator of seal quality as described in connection with FIG. 6. At step 114, control circuitry such as control circuitry 28 in device 10 and/or control circuitry 34 in headset 18 may be used to determine the quality of the earbud seal from the sound level measurements made at step 112.

At step 116, appropriate actions may be taken by device 10 and/or headset 18 based on the measured seal quality. If, for example, seal quality is low, a warning or other message may be displayed for the user. Low seal quality in an earbud may also be counteracted by adjusting the playback volume (e.g., to raise the volume of the audio in that earbud to compensate for the loose seal). By performing volume adjustments on an earbud-by-earbud basis, balance between the two earbuds (i.e., left-right stereo balance) may be improved. If desired, the volume that is adjusted may be adjusted more at one frequency than another. Bass performance tends to suffer when seal quality is poor, so increasing the bass portion of the played back audio in response to detection of a poor earbud seal may help compensate for this effect. More than one of these approaches may be used simultaneously if desired. For example, bass may be accentuated while increasing the overall volume level of an earbud and while simultaneously displaying an informative message for the user and temporarily disabling noise cancellation.

As illustrated by line 117, the operations of steps 110, 112, 114, and 116 may be repeated during operation of device 10 and headset 18.

Figure 11:
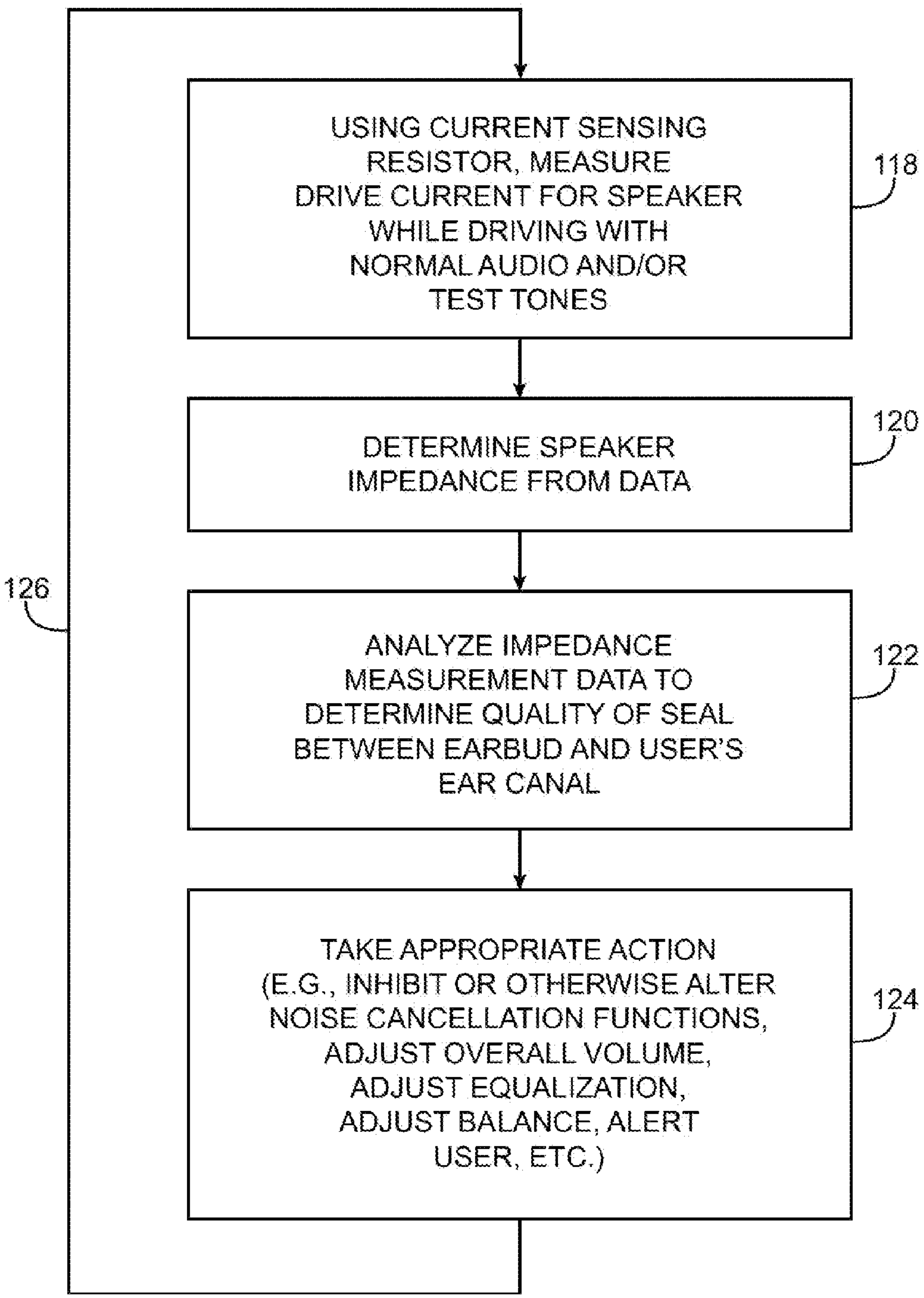
FIG. 11 is a flow chart of illustrative steps involved in using current sensing circuitry to make speaker drive current measurements to determine earbud seal quality and in taking appropriate actions based on the measured seal quality in accordance with an embodiment of the present invention.

Illustrative steps involved in evaluating earbud seal quality using current sensing circuitry such as current sensing circuitry 86 of FIG. 9 are shown in FIG. 11.

At step 118, circuitry 28 and/or circuitry 34 may generate drive signals for speaker 104 at one or more desired test frequencies. The test frequencies may be low frequencies (e.g., frequencies in the hundreds of Hz) when it is desired to detect impedance peak shifts as described in connection with peaks 48 and 50 of FIG. 5. The test frequencies may be generated at higher frequencies to detect changes such as the change from point 56 to point 58 or the change from point 60 to point 62 in FIG. 5. High frequency signals may, for example, be generated at ultrasonic frequencies (e.g., at one or more frequencies above 20 kHz). A set of ultrasonic frequencies may, for example, be generated in series at frequencies of 50 kHz, 60 kHz, 70 kHz, and 80 kHz (as examples). As each test tone is generated at a known strength, current sensing circuitry 86 may be used to gather corresponding current measurements that are provided to circuitry 28 and/or circuitry 34.

At step 120, the current measurements from current sensing circuitry 86 and the known value of the test tone signals are processed using circuitry 28 and/or circuitry 34 to produce corresponding impedance measurement data.

The impedance data that is produced using the operations of step 120 may be analyzed to determine the quality of the earbud seal at step 122. Circuitry 28 and/or circuitry 34 may be used in performing the analysis operations of step 122.

At step 124, appropriate actions may be taken by device 10 and/or headset 18 based on the measured seal quality. If seal quality is low, a warning or other message may be displayed for the user (as an example). Audio adjustments may also be made using circuitry 28 and/or circuitry 34. Low seal quality in an earbud may, for example, be addressed by adjusting the volume of the output audio (e.g., to raise the volume of the audio in that earbud to compensate for a poor seal). Volume adjustments may include balance adjustments, equalization adjustments, combinations of balance, total volume, and equalization adjustments, etc. If desired, noise cancellation settings may be adjusted based on the measured seal quality (e.g., to adjust noise cancellation strength or to turn on or off noise cancellation).

As illustrated by line 126, the operations of steps 118, 120, 122, and 124 may be repeated. For example, the operations of FIG. 11 may be repeated continuously in real time during operation of device 10 and headset 18.

Figure 12:
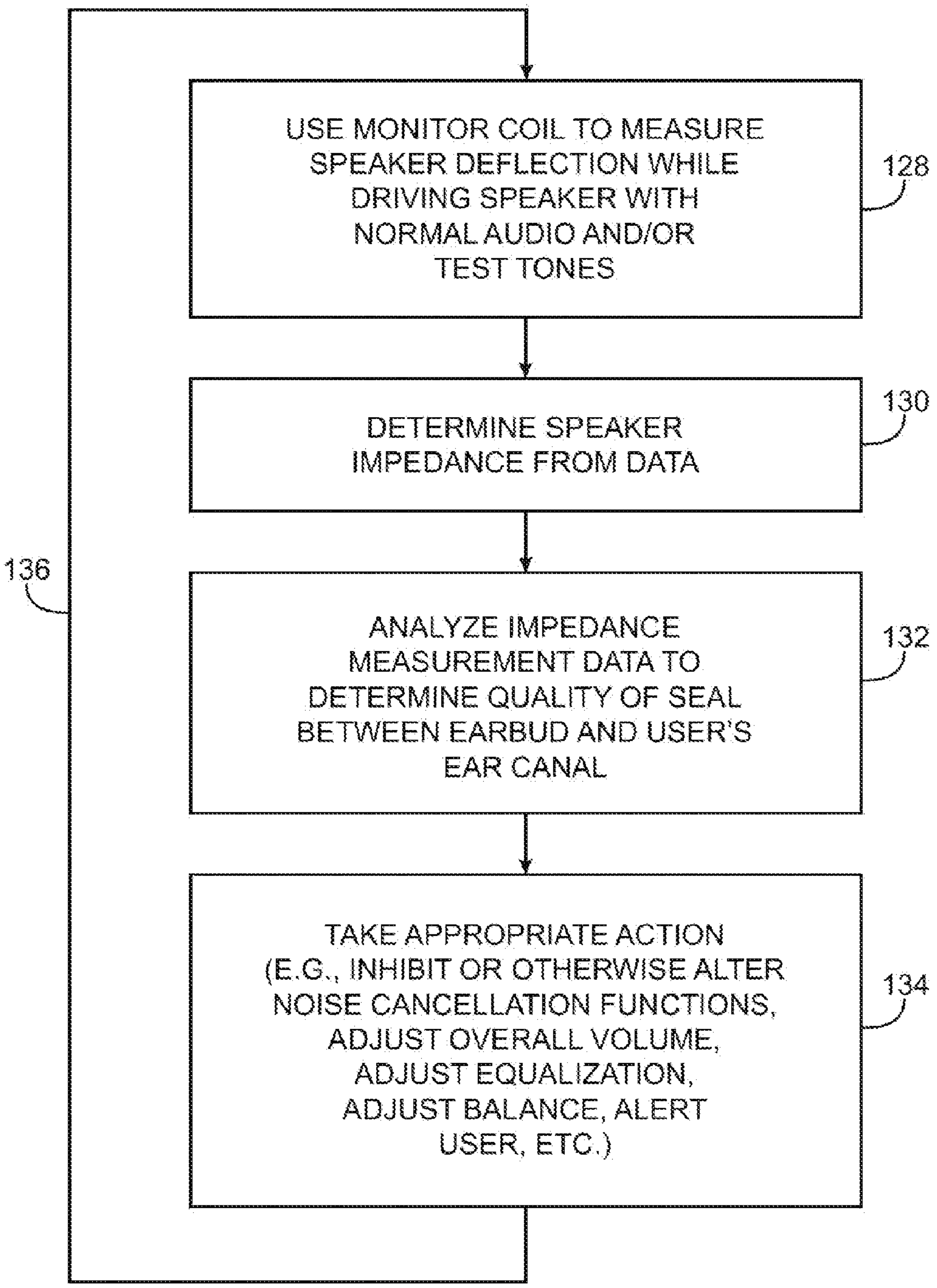
FIG. 12 is a flow chart of illustrative steps involved in using a secondary speaker coil to make speaker drive current measurements to determine earbud seal quality and in taking appropriate actions based on the measured seal quality in accordance with an embodiment of the present invention.

FIG. 12 shows illustrative steps that may be used in evaluating earbud seal quality using a tap coil such as tap coil 106 of FIG. 9.

At step 128, circuitry 28 and/or circuitry 34 may generate drive signals for speaker 104 at one or more desired test frequencies. As with the measurements described in connection with FIG. 11, the test frequencies that are generated at step 128 of FIG. 12 may be at low frequencies (e.g., frequencies in the hundreds of Hz) or may be at higher frequencies. One or more test signal frequencies may be used. Low frequency signals may be used as test signals when it is desired to detect impedance peak shifts of the type described in connection with peaks 48 and 50 of FIG. 5. Higher frequencies such as ultrasonic frequencies may also be used (e.g., at frequencies of 50 kHz, 60 kHz, 70 kHz, and 80 kHz). Test tones may be provided in the form of sine waves. As each test tone is generated, current sensing circuitry may be used to monitor the current flowing through tap coil 106. These current measurements may then be provided to circuitry 28 and/or circuitry 34.

At step 130, the current measurements and the known test tone signal magnitudes are processed using circuitry 28 and/or circuitry 34 to produce corresponding impedance measurement data.

The impedance measurement data that is produced using the operations of step 130 may be analyzed to determine the quality of the earbud seal at step 132. Circuitry 28 and/or circuitry 34 may be used in performing the analysis operations of step 132.

At step 134, appropriate actions may be taken by device 10 and/or headset 18 based on the measured seal quality. Warnings or other messages may be displayed for the user if the seal quality drops below a given threshold amount. Audio adjustments may be made using circuitry 28 and/or circuitry 34 to compensate for performance losses produced by lowered seal quality. Circuitry 28 and/or circuitry 34 may compensate for low seal quality by adjusting the volume of the output audio. For example, the volume of the audio may be raise to compensate for sound loss due to a poor seal. Balance adjustments, equalization adjustments, noise cancellation circuitry adjustments, and combinations of balance, overall volume, equalization, and noise cancellation adjustments may also be made.

As illustrated by line 136, the operations of steps 128, 130, 132, and 134 may be repeated. For example, the operations of FIG. 12 may be repeated continuously in real time during operation of device 10 and headset 18.

Although examples in which headset 18 uses earbuds that form seals with a user's ears have sometimes been described as an example, the seal assessment techniques described herein may be used in the context of other types of headsets (e.g., headsets with over-the-ear speakers, etc.).

In general, seal quality assessment operations can be performed using circuitry 34 in headset 18, using circuitry 28 in electronic device 10, or using circuitry 28 and 34 together. Appropriate actions based on the seal quality assessment results may likewise be performed using circuitry 34 in headset 18, using circuitry 28 in electronic device 10, or using both circuitry 28 and 34.

For example, circuitry 34 may be used to perform seal assessment operations locally in headset 18, without significant assistance from device 10. In this type of arrangement, circuitry 34 may use noise cancellation circuitry output to asses seal quality. Circuitry 34 may also generate test tones and may perform impedance measurements and/or acoustic measurements with an earbud microphone to gather impedance data and/or sound amplitude data. The data that is acquired in this way may be processed locally using the circuitry in headset 18. Circuitry 34 in headset 18 may also use locally-generated output from noise cancellation circuitry in headset 18 in assessing seal quality. Headset 18 may take a corresponding action based on the measured seal quality using local circuitry 34 or may use circuitry 34 to inform circuitry 28 of device 10 of the seal quality so that device 10 can respond accordingly.

Seal assessment locations may, if desired, be performed primarily or exclusively using circuitry 28. For example, circuitry 28 may generate test tones that are applied to the earbud speaker while using a current sensing circuit in circuitry 28 to monitor resulting drive currents. In this type of situation, the process of generating the test tone signal and the process of evaluating the resulting speaker current can be performed using circuitry 28. Circuitry 28 may similarly drive a test tone onto the earbud speaker while monitoring the current from a secondary coil. If desired, circuitry 34 in headset 18 may monitor the secondary coil current and may transmit a corresponding digital or analog signal to circuitry 28 so that circuitry 28 may compute the speaker impedance. Circuitry 28 may, if desired, generate a test signal for making acoustic seal measurements. For example, circuitry 28 may generate a test tone such as a sine wave test tone at a low frequency (e.g., a frequency of less than 15 Hz). This test tone may be driven through the headset speaker. Circuitry 28 may evaluate the resulting microphone signals gathered by an in-ear microphone. Seal quality may also be assessed based on the current operating settings of noise cancellation circuitry 30 in circuitry 28. Once the seal quality has been assessed, device 10 can respond accordingly. Device 10 can also send control signals to headset 18 to adjust headset 18 (e.g., to increase the gain of an amplifier that is located in circuitry 34, to adjust noise cancellation circuitry in circuitry 34, etc.).

In some situations, seal assessment operations can be performed by taking raw data measurements in headset 18 and by performing corresponding data analysis operations in device 10. For example, device 10 may instruct circuitry 34 to generate a test tone and may instruct circuitry 34 to measure a resulting current or to make an acoustic amplitude measurement using an earbud microphone. Circuitry 34 may then generate appropriate test signals and may gather the resulting electrical or acoustic data. Data for noise cancellation circuitry in circuitry 34 may also be gathered. Communications circuitry in circuitry 34 may transmit the gathered measurements to circuitry 28 in device 10 for additional processing. For example, circuitry 28 in device 10 may perform impedance calculations, calculations to determine a seal quality parameter from raw current and voltage data, or other suitable seal assessment calculations that are based on the data transmitted from circuitry 34 of device 10. Appropriate seal-quality-based actions may then be taken in device 10 and/or in headset 18.

As these examples demonstrate, seal assessment operations can be implemented using any suitable division of the resources located in device 10 and headset 18. Resulting actions may likewise be taken by device 10, headset 18, or both device 10 and headset 18. The descriptions of possible divisions of resources that are provided herein are merely illustrative.

The foregoing is merely illustrative of the principles of this invention and various modifications can be made by those skilled in the art without departing from the scope and spirit of the invention.

What is claimed is:

1. An electronic audio device for use with a pair of earbuds, each earbud having a respective microphone and a respective speaker located therein, comprising:

noise cancellation circuitry to be coupled to the respective microphones and speakers; and control circuitry to evaluate a seal quality of each earbud to the user's ear based on seal quality measurements made while driving a signal into the respective speaker located in the earbud and then to adjust the noise cancellation circuitry according to the evaluated seal quality.

2. The accessory defined in claim 1 further comprising a cable that plugs into an electronic device to receive audio signals that are used to drive the signal into the respective speaker located in each earbud.

3. The audio device defined in claim 1 wherein the control circuitry is to evaluate the seal quality by driving test tones through the speakers.

4. The audio device defined in claim 3 wherein the control circuitry is to evaluate the seal quality of an earbud by measuring a current that reflects an impedance value associated with the respective speaker, while driving the test tone through the respective speaker.

5. The audio device defined in claim 1 wherein the control circuitry is to evaluate the seal quality by making acoustic measurements using the microphones.

6. The audio device defined in claim 1 wherein the noise cancellation circuitry is to disable a noise cancellation level when the seal quality is low and activate a noise cancellation level when the seal quality is adequate.

7. The audio device defined in claim 1 wherein the control circuitry is to vary a further parameter responsive to the evaluated seal quality, wherein the further parameter is one of a sound volume, equalization, and balance between the speakers.

8. The audio device defined in claim 1 wherein the control circuitry is to signal a warning message to be displayed in response to the evaluated seal quality.

9. The audio device defined in claim 1 wherein the control circuitry is to evaluate the seal quality by measuring an amount of noise cancellation being performed by the earbud.

10. A method for using an electronic device that provides audio for a user through a pair of speakers that are contained in earbuds that are located in the user's ears, comprising:

with circuitry located at least partly in the electronic device, driving signals into the speakers in the earbuds;

with the circuitry, evaluating how well the earbuds are sealed to the user's ears based at least partly on seal measurements made by driving the signals into the speakers; and using the circuitry in adjusting noise cancellation circuitry.

11. The method defined in claim 10 wherein evaluating how well the earbuds are sealed comprises making current measurements that reflect impedance values associated with the speakers.

12. The method defined in claim 11 wherein the signals comprise test tones and wherein making the current measurements comprises making the current measurements while driving the test tones into the speakers.

13. The method defined in claim 10 wherein evaluating how well the earbuds are sealed comprises making acoustic measurements with microphones in the earbuds.

14. The method defined in claim 13 wherein the signals comprise test tones at frequencies less than 15 Hz and wherein making the acoustic measurements comprises using the microphones in the earbuds to make acoustic measurements while driving the test tones at frequencies less than 15 Hz into the speakers.

15. The method defined in claim 10 wherein adjusting the noise cancellation circuitry comprises inhibiting noise cancellation operations in the speakers when the seal measurements indicate that seal quality between the earbuds and the user's ears is less than a given seal quality level.

16. A method for using an electronic device that provides audio for a user through a pair of speakers that are contained in earbuds that are located in the user's ears, comprising:

with circuitry located at least partly in the electronic device, driving signals into the speakers in the earbuds;

with the circuitry, evaluating how well the earbuds are sealed to the user's ears based at least partly on seal measurements made by driving the signals into the speakers; and displaying a warning message on a display in the electronic device in response to the seal measurements.

17. The method defined in claim 16 further comprising:

using the circuitry in adjusting volume levels in the speakers based at least partly on the seal measurements.

18. The method defined in claim 16 further comprising:

using the circuitry in making equalization adjustments for the earbuds based at least partly on the seal measurements.

19. A method for using an accessory that has earbuds and noise cancellation circuitry and that uses the noise cancellation circuitry to play audio for a user through a pair of speakers that are contained in the earbuds while the earbuds are located in the user's ears, comprising:

with circuitry located at least partly in the accessory, evaluating how well the earbuds are sealed to the user's ears based at least partly on seal measurements made using the noise cancellation circuitry; and with the circuitry, taking action in response to the seal quality.

20. The method defined in claim 19 wherein taking action comprises inhibiting noise cancellation operations in the accessory when the seal measurements indicate that seal quality between the earbuds and the user's ears is less than a given seal quality level.

21. The method defined in claim 20 further comprising:

supplying noise signals to the noise cancellation circuitry using at least one microphone that is associated with at least one of the earbuds.

22. The method defined in claim 19 wherein evaluating how well the earbuds are sealed to the user's ears comprises:

measuring an amount of noise cancellation being performed in the earbuds; and determining a level of seal quality based on the measured amount of noise cancellation being performed in the earbuds.

* * * * *